(12) United States Patent
Kosaka

(10) Patent No.: US 11,010,978 B2
(45) Date of Patent: May 18, 2021

(54) METHOD AND SYSTEM FOR GENERATING AUGMENTED REALITY INTERACTIVE CONTENT

(71) Applicant: KYOCERA Document Solutions Inc., Osaka (JP)

(72) Inventor: Naohiko Kosaka, Dublin, CA (US)

(73) Assignee: KYOCERA Document Solutions Inc., Osaka (JP)

(*) Notice: Subject to any disclaimer, the term of this patent is extended or adjusted under 35 U.S.C. 154(b) by 49 days.

(21) Appl. No.: 16/436,803

(22) Filed: Jun. 10, 2019

(65) Prior Publication Data
US 2020/0388076 A1 Dec. 10, 2020

(51) Int. Cl.
| | |
|---|---|
| G06T 19/00 | (2011.01) |
| G06K 9/34 | (2006.01) |
| G06K 9/00 | (2006.01) |
| G06F 3/16 | (2006.01) |
| G06F 3/01 | (2006.01) |
| G06F 40/295 | (2020.01) |

(52) U.S. Cl.
CPC ............ *G06T 19/006* (2013.01); *G06F 3/011* (2013.01); *G06F 3/167* (2013.01); *G06F 40/295* (2020.01); *G06K 9/00463* (2013.01); *G06K 9/00469* (2013.01); *G06K 9/344* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 2007/0153331 | A1* | 7/2007 | Ueda | H04N 1/00132 358/1.18 |
| 2011/0035656 | A1* | 2/2011 | King | H04N 1/00331 715/234 |
| 2014/0281903 | A1* | 9/2014 | Le Chevalier | G06F 16/93 715/234 |

* cited by examiner

*Primary Examiner* — Yanna Wu
(74) *Attorney, Agent, or Firm* — Rowan TELS LLC

(57) ABSTRACT

A method and system for generating interactive AR content. The method and system disclosed herein allow a user to digitally capture printed content and interact with that printed content in an AR session. AR session interaction provides access to dynamic, up-to-date, and contextually relevant information based on the characteristics of the printed content, as well as current date, time, and location information collected either from the user or from the devices used to implement the AR session.

20 Claims, 11 Drawing Sheets

504
CREATING SOURCE DOCUMENT

510
IDENTIFYING DOCUMENT AND OBJECT BOUNDARIES

520
SUPERIMPOSING PARTIAL CONTENT

522
NEW DOCUMENT

SOURCE DOCUMENT, BOUNDARIES IDENTIFIED

SELECTION MENU BASED ON KEYWORDS

NEW DOCUMENT WITH FULLY SUPERIMPOSED CONTENT

NEW BLANK AR TEMPLATE 616   AR MENU 618

OPTION TO FULLY CUSTOMIZE NEW DOCUMENT

SOURCE DOCUMENT 702

OBJECTS AND LAYOUT 704

NEW DOCUMENT WITH AR CONTENT AND SOURCE CONTENT 710

AR MENU 708

SOURCE OBJECTS 706

METHOD AND SYSTEM FOR GENERATING AUGMENTED REALITY INTERACTIVE CONTENT

BACKGROUND

Printed materials, such as brochures and posters, provide a cost-effective means of widely distributing both general and time-sensitive information. One downside to using printed materials, however, is that if the information is rendered obsolete by the passage of time, the printed materials may no longer be useful. Old posters will not be helpful to anyone who sees them after the dates they advertise have passed. Seasonal activities in a brochure may not apply to tourists traveling during other seasons. Undistributed copies become waste paper. Updates require manual document manipulation and new print runs.

There is a need for a solution that provides interactive access to dynamic, up-to-date, topical content, in lieu of relying on static printed matter.

BRIEF SUMMARY

This disclosure relates to a method and a system for generating augmented reality (AR) interactive content. The method comprises first detecting a source document that includes at least one source text object, source image object, or some combination of these. A text analysis may be performed on the source text object(s) (if any), and an image analysis may be performed on the source image object(s) (if any). A layout analysis may also be performed, establishing document boundaries and object boundaries for the source document, and returning a source template based on the document boundaries and object boundaries. An AR session may be configured, including AR menus, an AR graphical user interface (GUI), and an AR content database. The AR content database may include AR text objects, AR image objects, and AR templates. The AR session may send a signal to indicate the user input. Based on this signal, a new document may be generated. The new document may comprise the source document modified by the signal from the AR session.

The system disclosed herein comprises an AR content database containing AR text objects, AR image objects, and AR templates. The system further comprises a user interface that allows a user to interact with the AR text objects, the AR image objects, the AR templates, and a source document. The source document may include least one of source text objects, source image objects, and combinations thereof. Finally, the system includes a computing apparatus, comprising a processor and a memory. The memory may store instructions that, when executed by the processor, configure the computing apparatus to execute the method disclosed herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
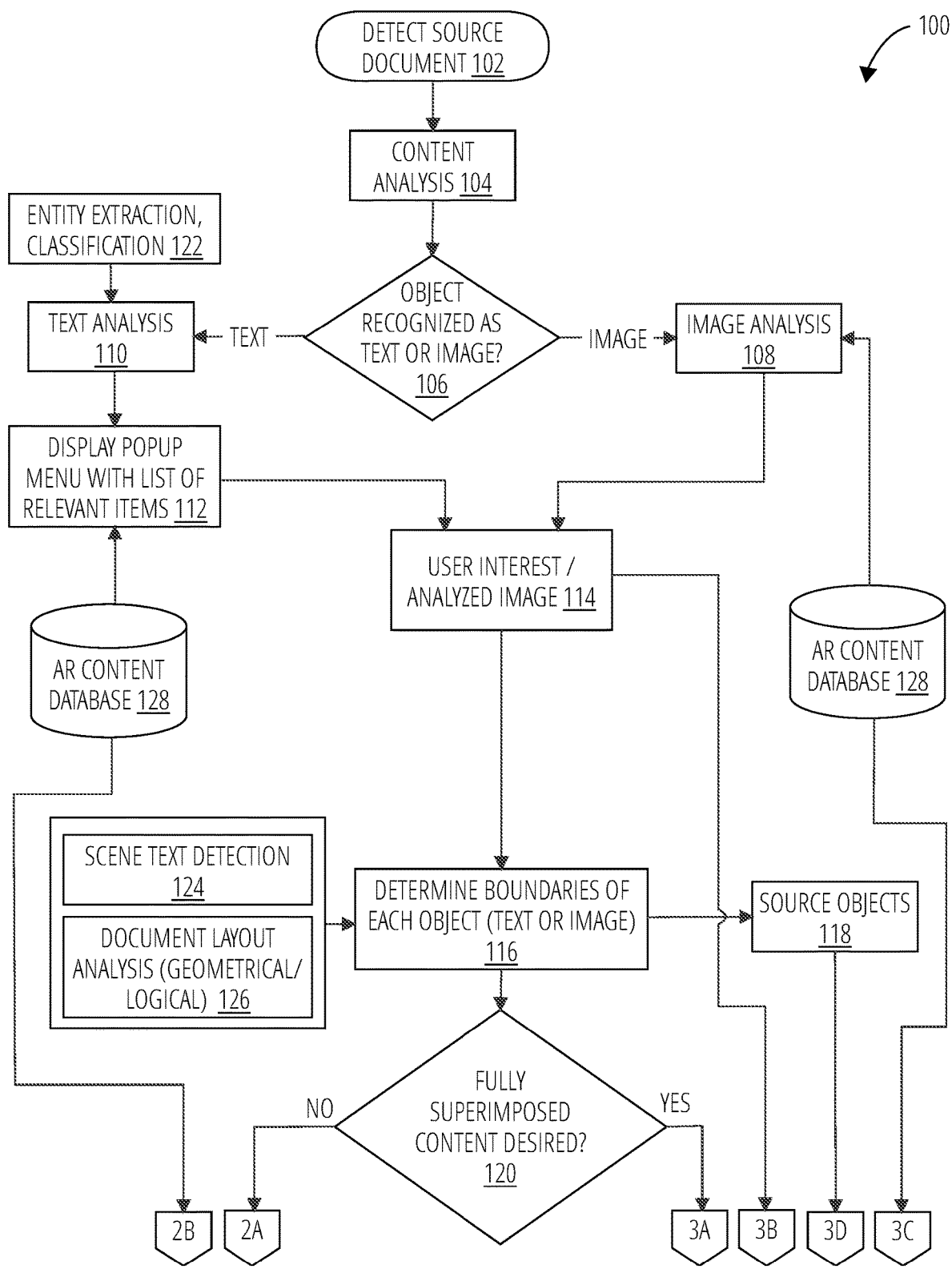
FIG. 1 illustrates an interactive AR method 100 in accordance with one embodiment.

This disclosure relates to a method and a system for generating augmented reality (AR) interactive content. The method comprises first detecting a source document that includes at least one source text object, source image object, or some combination of these. The source document may be created by capturing a digital image of printed content, wherein the printed content comprises at least one printed page. The printed content may be a poster or a brochure. In another embodiment, the source document may be created by downloading, uploading, or otherwise accessing at least one screen of digitally displayed content, saved from a digital source, containing at least one text object and/or image object.

A text analysis may be performed on the source text object(s) (if any). The text analysis may comprise executing optical character recognition to identify keywords in the source text object(s). The text analysis may further comprise searching the keywords for named entities, which may include people, places, and organization names. The keywords may also include date/time entities, including alphabetic and numeric indicators of date and time. The named entities may be used to determine the source document's location context. The date/time entities may be used to determine time sensitivity of the source document. One or more text filters may be operated to select AR text objects stored in an AR content database based on the keywords, the location context, and the time sensitivity. The selected AR text objects may be returned as a result of the text analysis.

An image analysis may be performed on the source image object(s) (if any). The image analysis may comprise executing image recognition logic to identify key parameters in the source image objects. One or more image filters may be operated to select AR image objects stored in the AR content database based on the key parameters. The selected AR image objects may be returned as a result of the image analysis. A layout analysis may also be performed, establishing document boundaries and object boundaries for the source document, and returning a source template based on the document boundaries and object boundaries.

An AR session may be configured, including AR menus, an AR graphical user interface (GUI), and the AR content database. The AR session may further include the source text objects, the source image objects, and the source template. The AR menus may provide access to the objects and templates in the AR content database. The AR GUI may accept user input that allows a user to replace at least one of the source text objects, the source image objects, the source template, and a combination thereof, with selections from the AR menus.

The user input to the AR session may comprise touch selection and touch navigation signals detected through a touch screen. The user input may also comprise voice selection and navigation signals detected through a microphone. This is accomplished by detecting vocal commands through the microphone, executing speech recognition logic to tokenize the user input into parts of speech, and using nouns as keywords to search the AR content database. The user input may also include a current date, a current time, and a current location, either entered manually (e.g., through touch or voice) or collected from a computing apparatus implementing the method (e.g., through GPS functionality, internal clocking, or time synchronization over the Internet). The current date, the current time, and the current location may be used to operate one or more filters to select the AR text objects and the AR image objects returned.

The AR session may also be configured to detect the user input in the form of handwritten text content and hand-drawn image content (i.e. Handwritten notes or drawings) generated over the source document by a user manipulating a touch screen or other input device. The dimensions and screen position of the handwritten notes or drawings may be detected, and the handwritten notes or drawings, their dimensions, and their screen position, may be saved for use in a new document.

The AR session may send a signal to indicate the user input. This signal may be used to modify the source document in order to return the new document. In some embodiments, the signal from the AR session may indicate that the new document contains partially superimposed content. The partially superimposed content may replace at least one of the source text objects and/or source image objects with AR text objects and/or AR image objects identified by the user. In this case, the source object boundaries may be identified for source text objects and/or source image objects to be replaced. The AR text object and/or AR image objects meant to replace the source text objects and/or source image objects may be configured to fit into the source object boundaries. The source object boundaries in the source document may be filled with a white area of equal dimensions. Finally, the new document may be generated by drawing the AR text objects and/or AR image objects over the white area.

In other embodiments, the signal from the AR session may indicate that the new document contains fully superimposed content. The fully superimposed content replaces all of the source text objects and the source image objects with the AR text objects and the AR image objects identified by the user. In this case, the user may be queried to select the AR template, the AR text objects, and the AR image objects desired from the AR content database. The AR text objects and AR image objects selected may be configured to fit the selected AR template. Finally, the new document may be generated by drawing the AR text objects and the AR image objects over the AR template.

The new document generated with the signal from the AR session may be saved in a local memory, a cloud data repository, or some other data storage location. The new document may also be printed by a printer, multifunctional peripheral device, or other method of generating printed content.

The system disclosed herein comprises an AR content database containing AR text objects, AR image objects, and AR templates. In some embodiments, the AR content database may be cloud-based and accessed through a network interface. The system further comprises a user interface that allows a user to interact with the AR text objects, the AR image objects, the AR templates, and a source document. The user interface may include a touch screen. The user interface may also include a microphone. The user interface may be implemented via a computer work station, a smart device such as a tablet computer or smartphone, or other hardware configuration providing a visual display, user input devices, and the connections needed to access the AR content database.

The system disclosed herein may include a camera or scanner capable of generating the source document from printed content. The system may include a printing device, such as a printer or multifunctional peripheral device capable of creating a physical copy of the new document. Finally, the system includes a computing apparatus, comprising a processor and a memory. The memory may store instructions that, when executed by the processor, configure the computing apparatus to execute the method disclosed herein.

Referring to FIG. 1, one embodiment of the interactive AR method 100 claimed herein is illustrated step-by-step. First, in step 102, a source document may be detected, containing at least one text object and/or image object. A camera or scanner may be used to detect at least one page of printed matter, such as a poster or brochure, and create a digital version that becomes the source document. In alternate embodiments, the source document may be created by downloading, uploading, or otherwise accessing at least one screen of digitally displayed content, saved from a digital source, containing at least one text object and/or image object. This screen of digitally displayed content may be a downloaded image file, a Portable Document Format (PDF) file, a screen capture, or some similar file containing text and/or images.

In step 104, content analysis may begin. The content analysis may identify text objects and image objects in the source document. Depending on the type of object, additional analysis may be performed as indicated starting with step 106.

For image objects, image analysis may be performed (step 108). The image analysis may comprise executing image recognition logic to identify key parameters in the source image objects. One or more image filters may be operated to select AR image objects stored in the AR content database based on the key parameters. The selected AR image objects may be returned as a result of the image analysis.

A text analysis may be performed on the source text object(s) (if any) (step 110). The text analysis may comprise executing optical character recognition and natural language processing to identify keywords in the source text object(s). Text analysis may include entity extraction and classification (step 122). Text detected through optical character recognition may be processed to determine keywords. Keywords may be analyzed for named entities, which may include people, places, and organization names. In some embodiments, a natural language parser may provide this analysis. In more simplistic embodiments, named entities may be detected by searching for the terms in a specific, pre-defined list of the terms used to tag content within the AR content database. The keywords may also be analyzed for date/time entities, including alphabetic and numeric indicators of date and time. The named entities may be used to determine the source document's location context. The date/time entities may be used to determine time sensitivity of the source document. One or more text filters may be operated to select AR text objects stored in an AR content database based on the keywords, the location context, and the time sensitivity. The selected AR text objects may be returned as a result of the text analysis.

As a result of text and image analyses, related content may be selected from the AR content database 128. An AR GUI configured as part of an AR session may display a popup menu with a list of relevant items (step 112), based on the text analysis. Areas of user interest may be determined (step 114) based on user responses to the popup menu, as well as the text analysis and image analysis.

Object boundaries may be determined in step 116. In this step, the boundaries of each text and image object may be established, as well as the document boundaries of the source document. Scene text detection (step 124) and geometrical and logical analysis (step 126) may be used to complete step 116. Source objects may be identified for use later (step 118).

An AR session may be configured to include AR menus, an AR graphical user interface (GUI), and the AR content database. The AR session may further include the source text objects, the source image objects, and the source template. A user may be queried to determine what content will be replaced. User input may be detected from keyboard, mouse, touch screen, microphone, or other input devices. User selections may indicate fully superimposed content or partially superimposed content, prompting additional steps based on the type of superimposition indicated (step 120).

The order of steps indicated in this figure comprise only one embodiment. Analyses of layout, object composition, user interest, etc., may occur in a different order in other embodiments.

Figure 2:
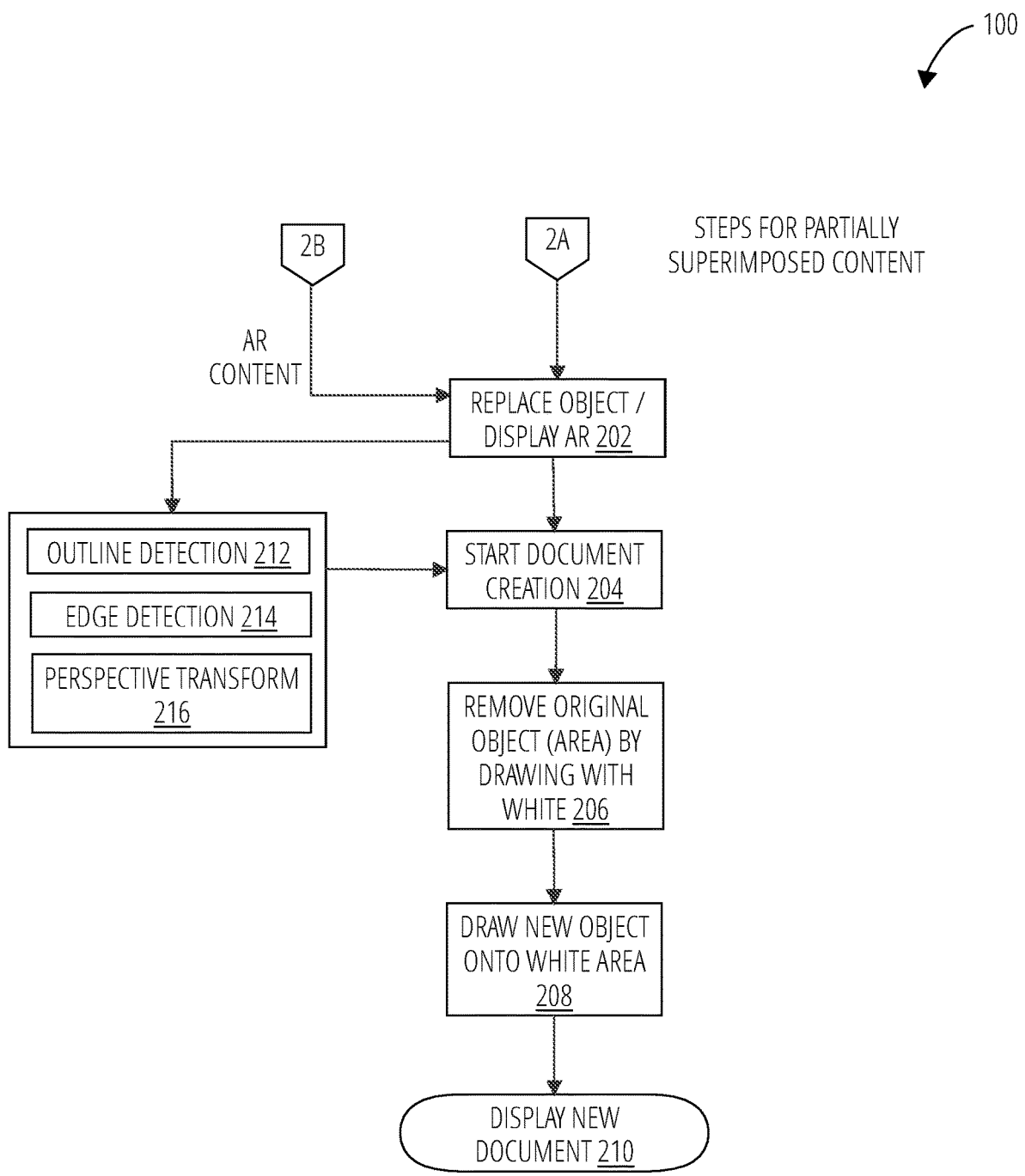
FIG. 2 illustrates an interactive AR method 100 in accordance with one embodiment.

Referring to FIG. 2, one embodiment of the interactive AR method 100 further comprises the following steps for partially superimposed content. The AR session may be configured to display an AR GUI. The AR GUI may be configured to present AR content and AR menus. In some embodiments, the signal from the AR session may indicate that the user desires the new document to contain partially superimposed content. The AR menu may present options for replacing some of the objects detected in the source document (step 202).

The source object boundaries may be identified for source text objects and/or source image objects to be replaced. AR content from the AR content database, selected for a new document, may be processed using outline detection (step 212), edge detection (step 214), and perspective transform (step 216) logic in order to configure the content so as to fit within the source object boundaries.

Document creation (step 204) may begin with removing the source objects to be replaced by drawing over the areas they comprise with white (step 206). The selected AR objects may then be drawn onto the appropriate white area (step 208). The AR session may then display the new document (step 210). In some embodiments, the new document may be further modified, saved, or printed.

Figure 3:
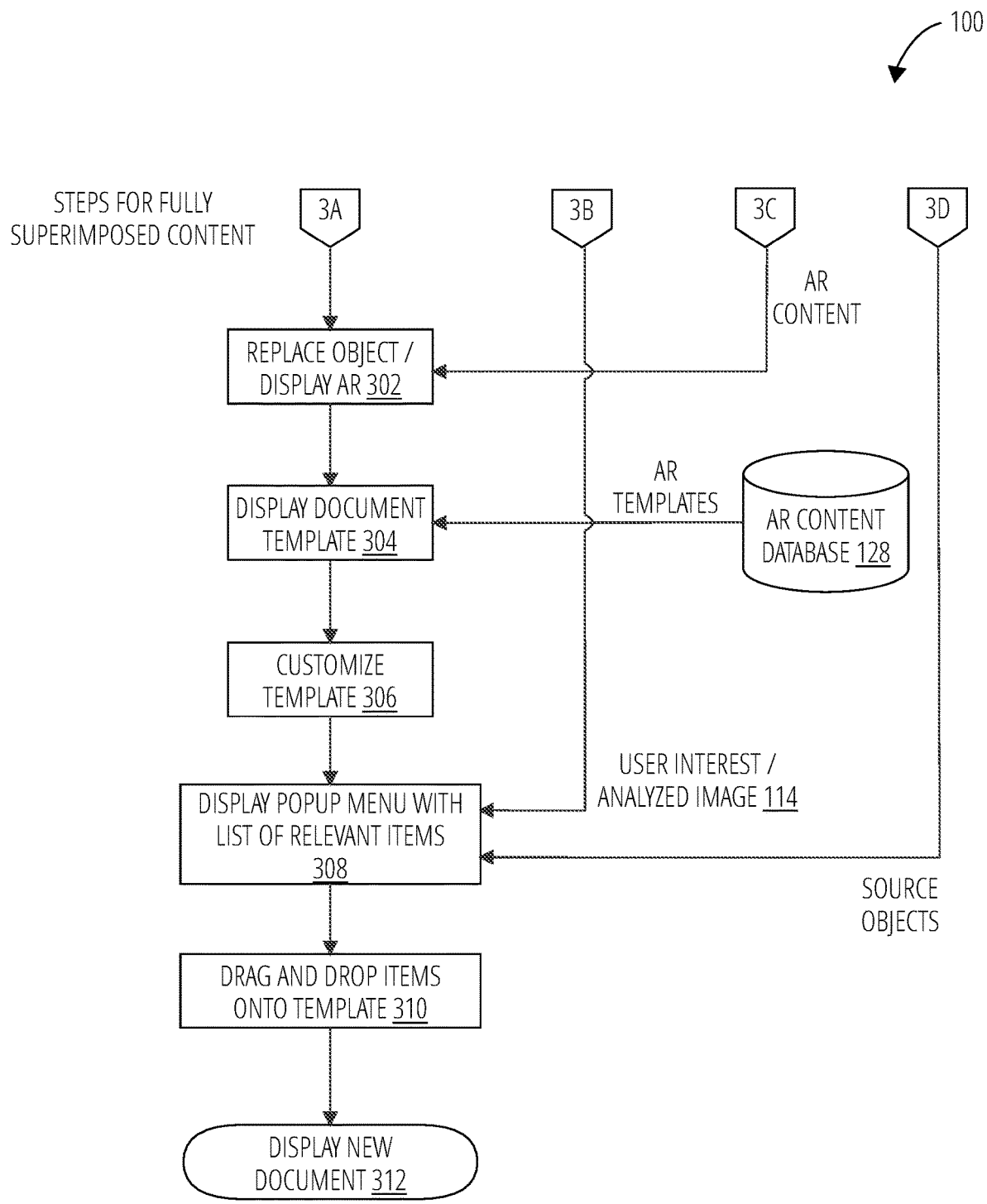
FIG. 3 illustrates an interactive AR method 100 in accordance with one embodiment.

Referring to FIG. 3, one embodiment of an interactive AR method 100 further comprises the following steps for fully superimposed content. The AR session may be configured to display an AR GUI. The AR GUI may be configured to present AR content and AR menus. In some embodiments, the signal from the AR session may indicate that the user desires the new document to contain partially superimposed content. The AR menu may present options for replacing the objects detected in the source document (step 302).

The user may be queried to select the AR template from the AR content database 128. The selected template may be displayed, as shown in step 304. The source template may also be used. The AR session may be configured to allow the user to customize the template (step 306) through the AR GUI.

The AR GUI may be configured to display popup menus listing relevant items (step 308). The source objects may be made available through the menus. The objects identified through querying user interest and analyzing source images (step 114) may also be listed in the AR menus. The user may use a user input device to select items from the menus and drag and drop them onto the template (step 310). The AR session may then display the new document (step 312). In some embodiments, the new document may be further modified, saved, or printed.

Figure 4:
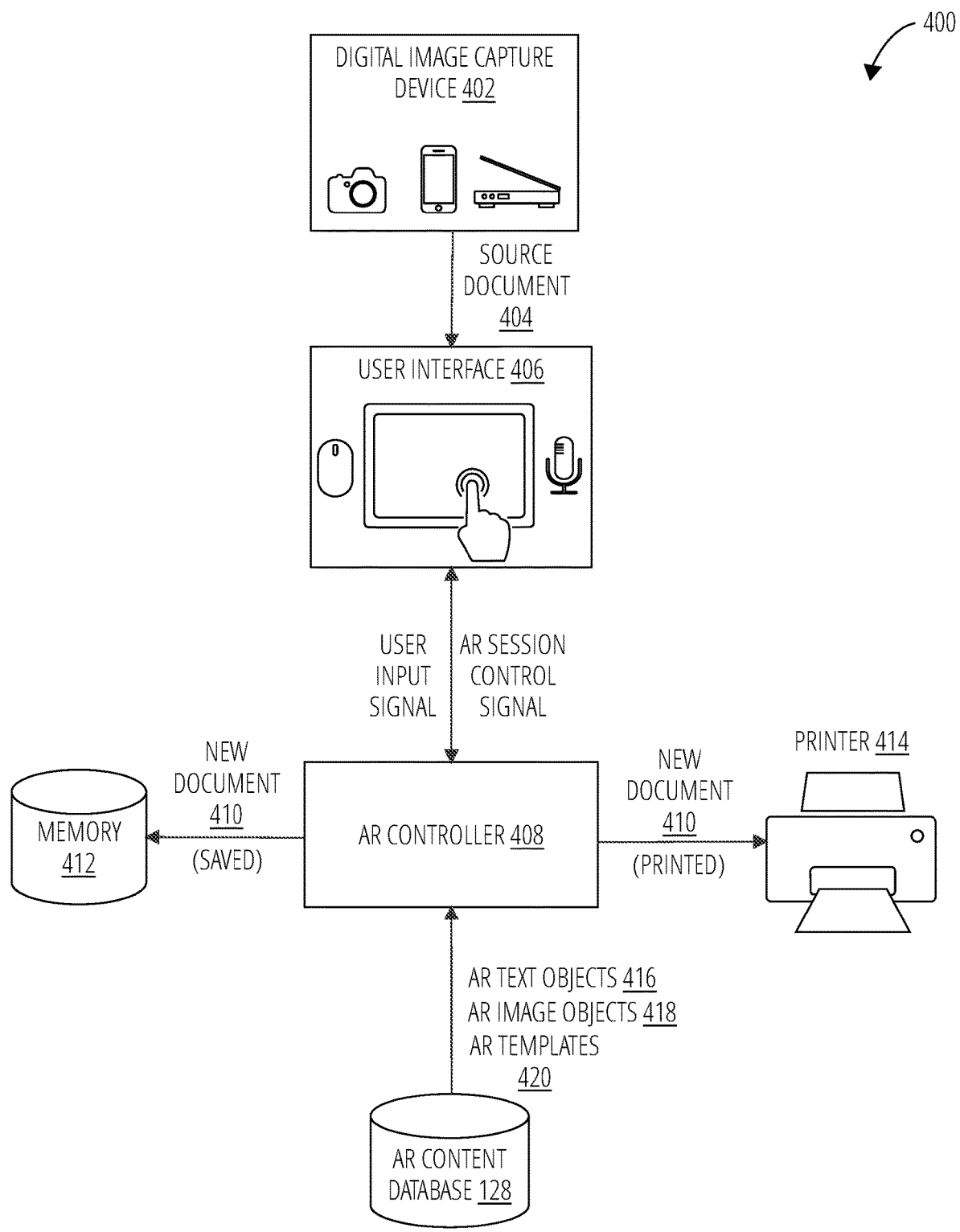
FIG. 4 illustrates an embodiment of an interactive AR system 400.

Referring to FIG. 4, an embodiment of an interactive AR system 400 comprises an AR content database 128, a digital image capture device 402, a user interface 406, an AR controller 408, a memory 412, and a printer 414.

The interactive AR system 400 may include a digital image capture device 402, which may be a camera, a smartphone, a tablet computer, a flatbed scanner, a multi-functional peripheral device, or any other device capable of capturing of a printed matter. The captured image may be used as a source document 404.

The source document 404 may be displayed on the user interface 406 of the interactive AR system 400. The user interface may comprise a display for the user to view the source document 404, along with the components of the AR GUI. The user interface 406 may also include devices to accept user input. User input devices may include a mouse, a keyboard, a microphone, and a touch screen, which may be integrated into the display device.

Figure 9:
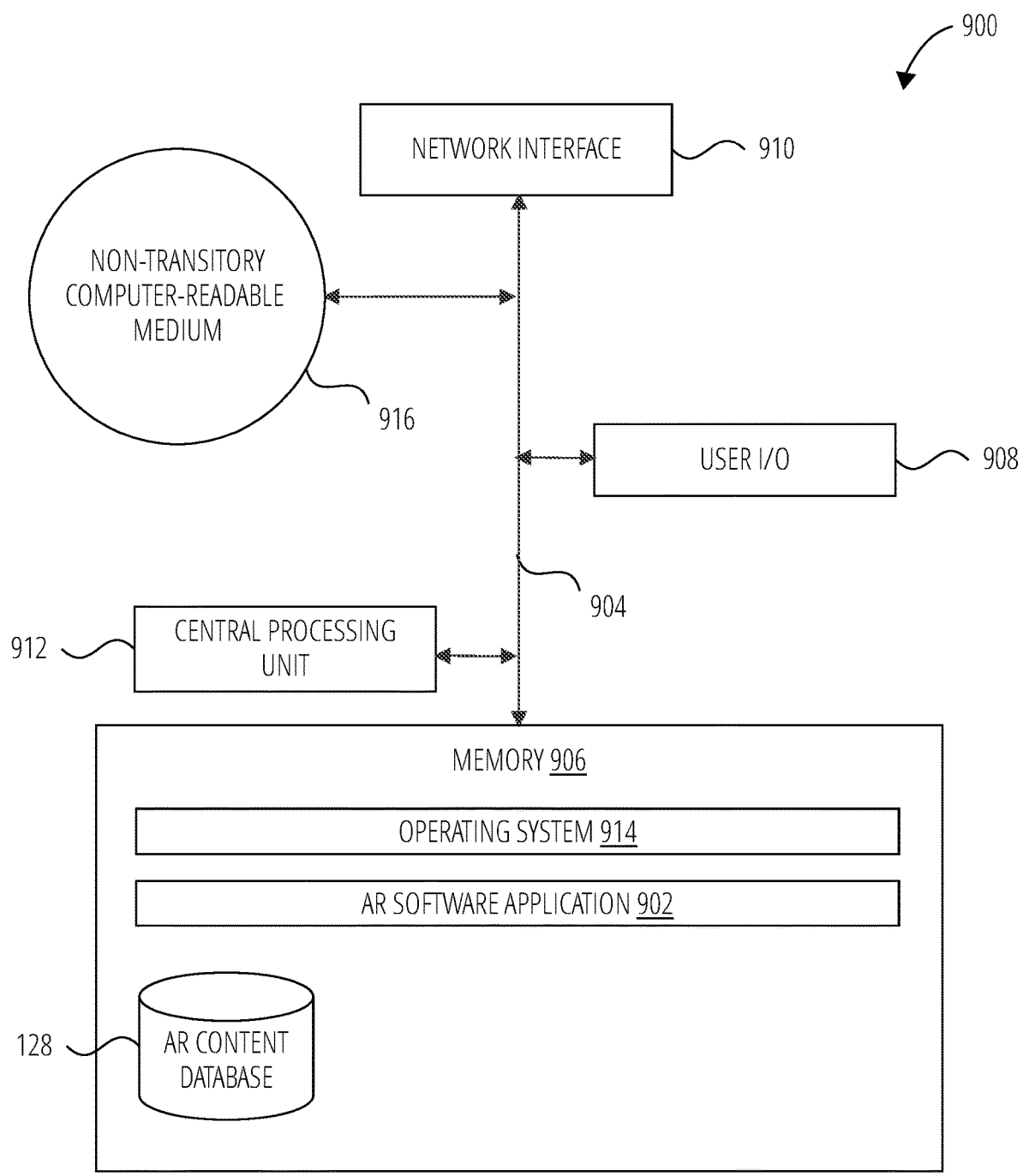
FIG. 9 illustrates a computing system 900 in accordance with one embodiment.

The interactive AR system 400 may include an AR controller 408. The AR controller 408 may comprise the logic used to configure the AR session displayed on the user interface 406. Components of this logic comprised by one embodiment are shown in more detail in FIG. 10 and FIG. 11. The AR controller 408 may be implemented as logic within a computing system 900, such as is shown in FIG. 9, in accordance with one embodiment.

The AR controller 408 of the interactive AR system 400 may connect to an AR content database 128. The AR content database 128 may be stored in cloud-based memory, accessed via the Internet, or over a local area network (LAN). The AR content database 128 may also be stored in local memory, on the computing apparatus housing the logic for the AR controller 408. AR text objects 416, AR image objects 418, and AR templates 420 may be stored on the AR content database 128 and may be accessed by the AR controller 408 for use in the AR session, as displayed on the user interface 406.

The interactive AR system 400 may include local or cloud-based memory 412. The new document 410 generated by the AR controller 408 based on a user input signal from the user interface 406 may be saved in digital file form to this memory 412. The interactive AR system 400 may also include a printer 414. The printer may be a desktop printer, a multifunctional peripheral device, or some other device capable of generating physical, printed matter from a digital file. the new document 410 generated by the AR controller 408 may be sent to the printer 414 to create an updated poster, brochure, or some other form of printed matter.

Referring to FIG. 5, the basic steps to create partially superimposed content 500 are illustrated. According to one embodiment, FIG. 5A shows a tablet computer with an integrated camera capturing printed content 502 in the form of a poster hung on a wall. In this example, the source document on device 504 can be seen to comprise a source text object 506 and a source image object 508.

Figure 5A:
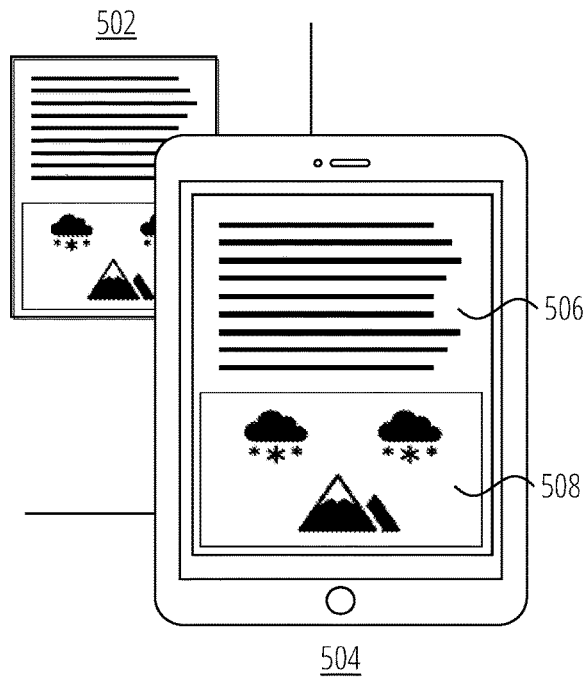
FIGS. 5 A-D illustrate partially superimposed content 500 in accordance with one embodiment.
Figure 5B:
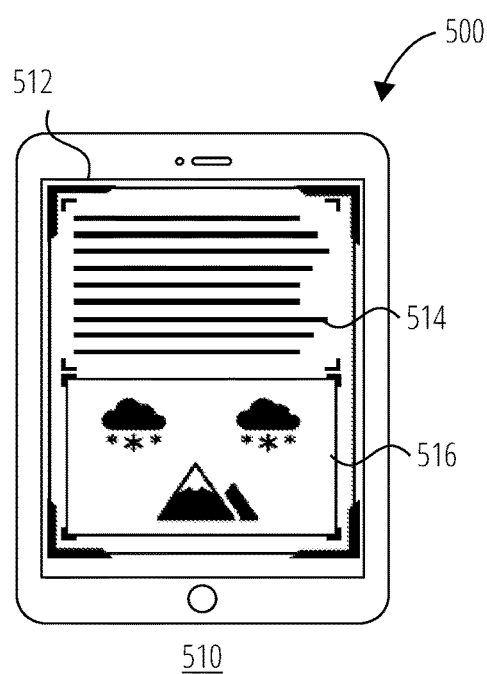

FIG. 5B illustrates the object detection 510 that occurs during layout analysis. Edge detection, outline detection, and other techniques may be used to establish source document boundaries 512. Similar techniques may be used to establish source object boundaries for an image object 516. Source object boundaries for a text object 514 may also be established.

Figure 5C:
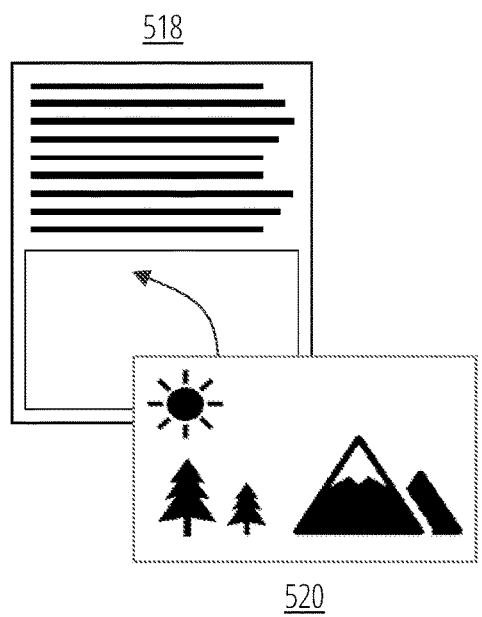

In this example, the text object detected is to be left alone, but the image object is to be replaced. FIG. 5C illustrates the document with field deleted 518. One may see how the source object boundaries for an image object 516 may be filled with white. The new AR image object 520 shown may be selected by the user. Image analysis of the original image may determine key parameters that facilitate identifying the mountain pictured. Named entities generated by parsing keywords in the text may also facilitate the identification. This information may be used to select other images of that mountain from the AR content database. In this example, a winter scene of the mountain is being swapped out for a summer scene.

Figure 5D:
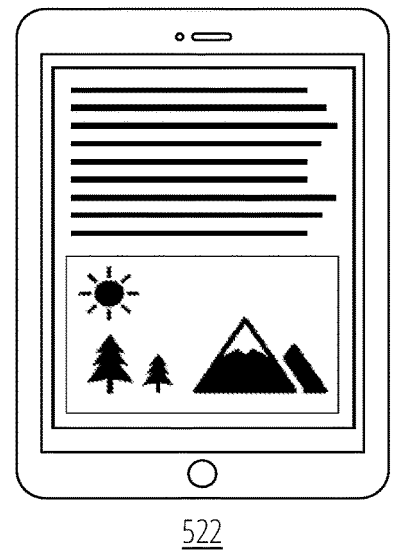

FIG. 5D shows the new document on device 522. The new AR image object 520 has been appropriately resized and drawn over the white area in the document with field deleted 518. The new document is ready to be saved or printed.

Referring to FIG. 6, the basic steps to create fully superimposed content 600 are illustrated. FIG. 6A shows a scanned document with objects identified 602. A text object at the top includes the keywords "outdoor activities." The image object below includes a picture of the Matterhorn in the winter. The text in the text object may contain information about winter activities such as skiing.

Figure 6A:
FIGS. 6 A-D illustrate fully superimposed content 600 in accordance with one embodiment.
Figure 6B:
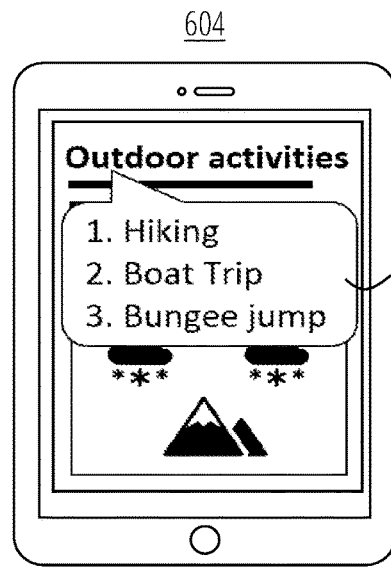

FIG. 6B shows the scanned document in an AR session 604. Also shown is a selection AR menu based on keywords 606 that may be generated by the AR controller 408 given the input of "outdoor activities." In this example, the user may choose the "Hiking" option from the menu.

Figure 6C:
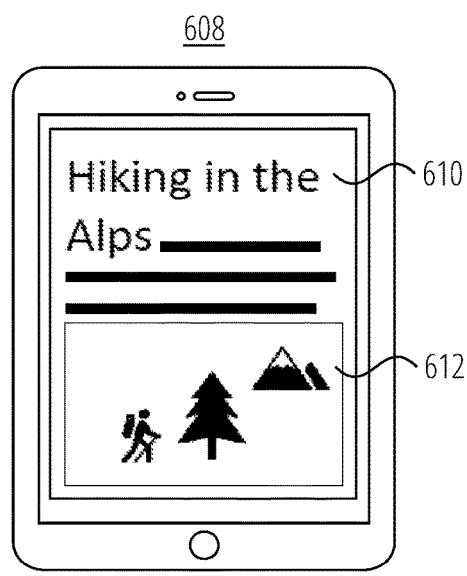

FIG. 6C shows an example new document on device with original source template and fully superimposed content 608. The user may navigate the AR menus provided via that AR GUI during the AR session to select new text content 610 and new image content 612 related to their user interests indicated in their AR menu selection.

Figure 6D:
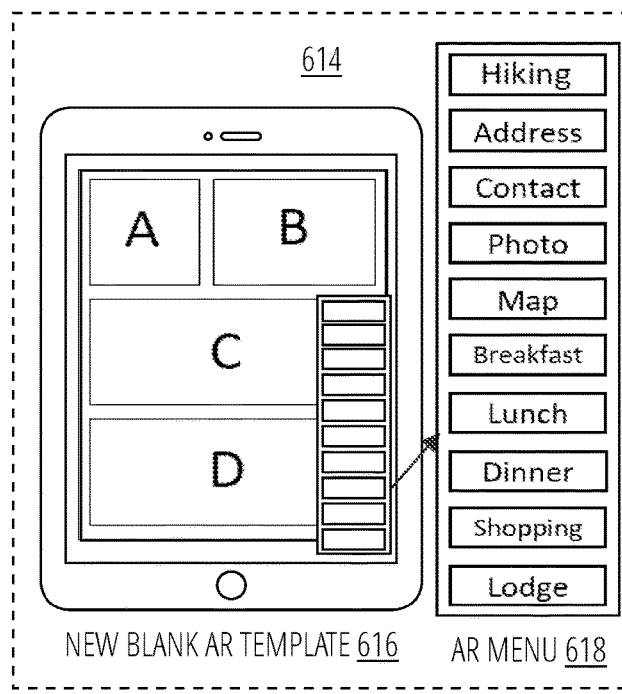

FIG. 6D shows an additional option to fully customize new document 614. A new blank AR template new blank AR template 616 may be selected through an AR menu. An additional AR menu 618 may be presented to allow the user to select information to populate the blank fields of the AR template. In this manner, a completely new document may be created quickly, based on information gathered from the original source document.

Referring to FIG. 7, the reuse of original content 700 alongside new AR content is illustrated. FIG. 7A shows a source document 702 with three separate text objects and an image object. FIG. 7B shows the objects and layout 704 as identified through text, image, and layout analysis. FIG. 5 and FIG. 6 have given examples of how the original template may be used, with one element replaced by an element of the same type, or all elements replaced by elements of the same type, as well as an example of how a new AR template may be selected.

Figure 7A:
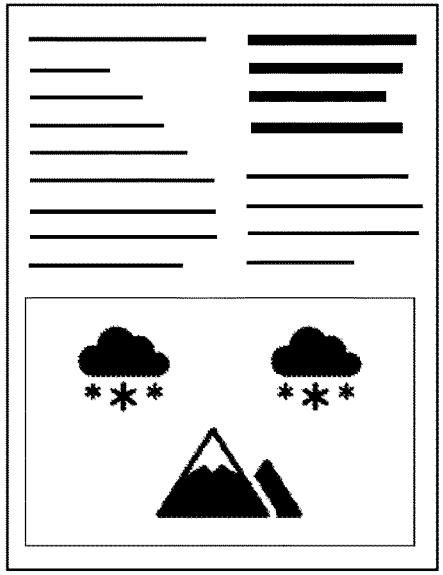
FIGS. 7 A-C illustrate reuse of original content 700 in accordance with one embodiment.
Figure 7B:
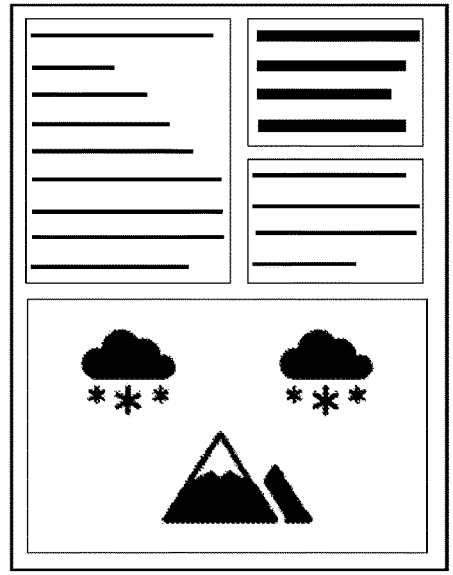
Figure 7C:
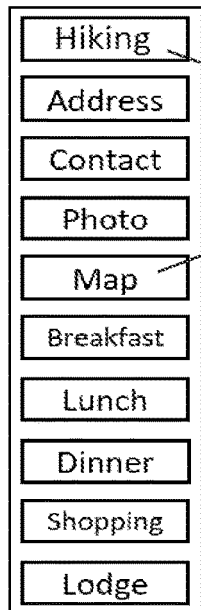
Figure 7C:
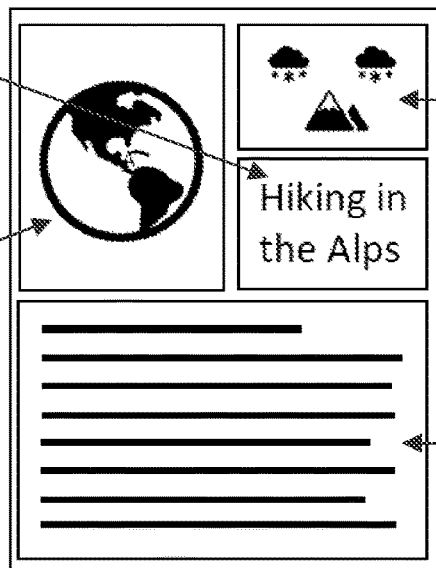
Figure 7C:
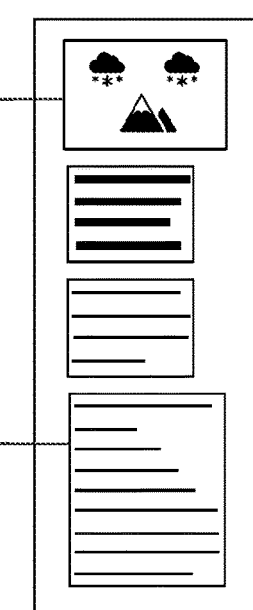

FIG. 7C illustrates an even more flexible application. The source template may be maintained, while all content from its fields is removed. Then new content may be selected from the AR menu 708 to populate some fields. The remaining fields may be populated using source objects 706 found in the original source document. The result may be a new document with AR content and source content 710. Any combinations of the features illustrated in this figure, FIG. 5, and FIG. 6 may be allowed by the various embodiments of the method and system disclosed herein.

Figure 8:
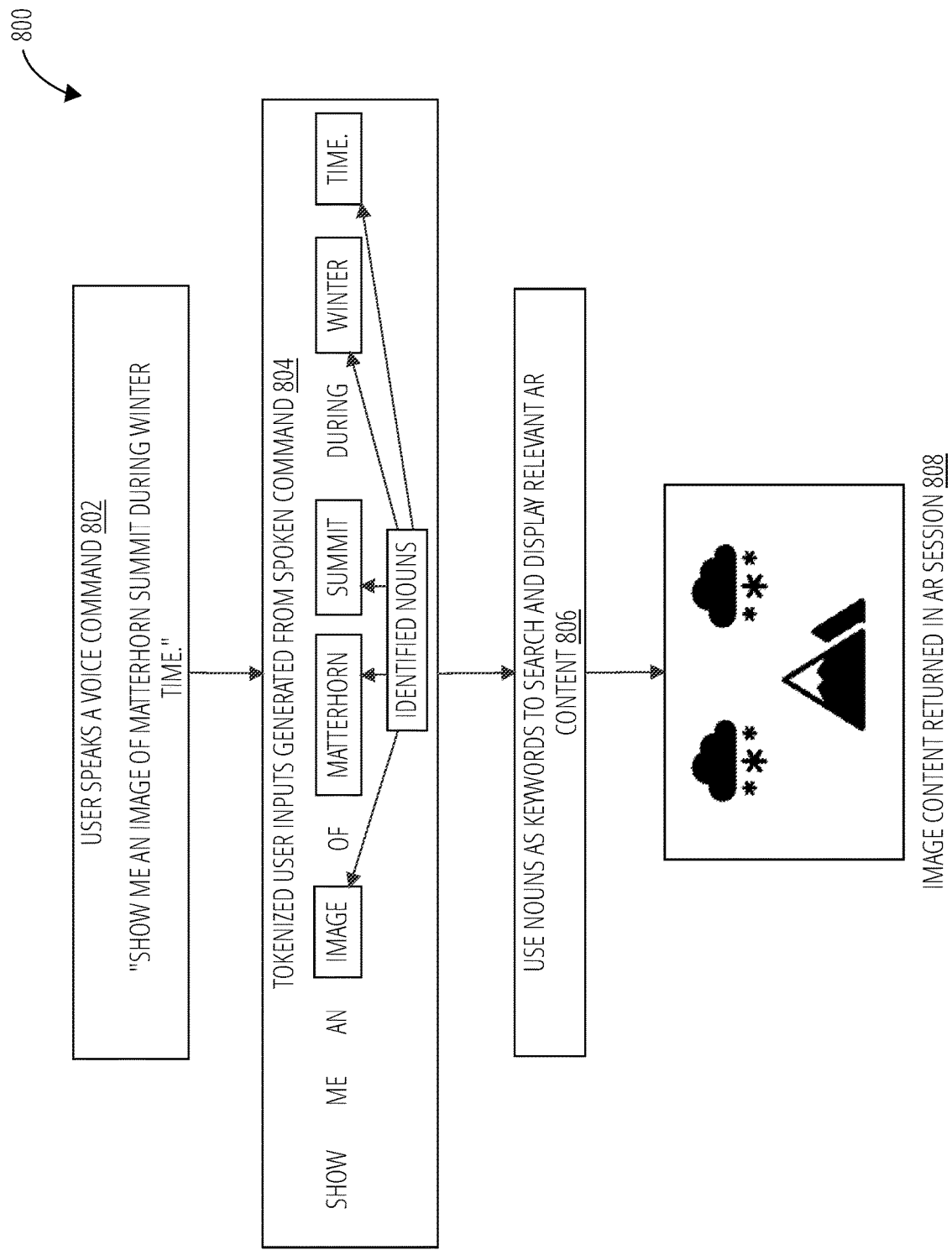
FIG. 8 illustrates user input tokenization 800 in accordance with one embodiment.

Referring to FIG. 8, a method for user input tokenization 800 is illustrated. The embodiment shown describes how a spoken voice command may be processed to detect keywords that may be used to filter content from the AR content database. This process may also be used for typed input, or to process text objects in the source document.

First, a user speaks a voice command 802. A microphone used as a user input device may detect the spoken command. The signal representing the spoken command may be sent through speech recognition logic, as part of the logic that generates and controls the AR session, or some other speech processing logic module.

The speech processing logic module may break down the recognized words into tokenized user inputs generated from spoken command 804. The tokenization may identify nouns used in the spoken command. Nouns may include general person, place, and thing terms, such as "image" or "summit." Nouns may also include named entities, such as specific people or places, such as "Matterhorn."

The AR session may use nouns as keywords to search and display relevant AR content 806. Images tagged with keywords such as "Matterhorn," "summit," and "winter," may be selected from the AR content database and returned for use as options in the AR menus. Image content returned in AR session 808 is illustrated as a potential result generated from the original voice command.

Referring to FIG. 9, several components of an exemplary computing system 900 are illustrated in accordance with one embodiment. Such a computing system 900 may comprise the processor, memory, and other components included in the system claimed herein. In various embodiments, computing system 900 may include a desktop PC, server, workstation, mobile phone, laptop, tablet, set-top box, appliance, or other computing device that is capable of performing operations such as those described herein. In some embodiments, computing system 900 may include many more components than those shown in FIG. 9. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, computing system 900 may comprise one or more physical and/or logical devices that collectively provide the functionalities described herein. In some embodiments, computing system 900 may comprise one or more replicated and/or distributed physical or logical devices.

In some embodiments, computing system 900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Computing system 900 includes a bus 904 interconnecting several components including a network interface 910, user I/O 908, a central processing unit 912, and a memory 906.

User I/O 908 may include a display with integrated touch screen, keyboard, mouse, microphone, scanner, and any other device associated with allowing the user to provide user input to the AR session. User I/O 908 may also include a printer or multifunctional peripheral device allowing the user to generate physical, printed output from the AR session in the form of a printed new document.

Memory 906 generally comprises a random access memory ("RAM") and permanent non-transitory mass storage device, such as a hard disk drive or solid-state drive. Memory 906 stores an operating system 914. Memory 906 may also store an AR software application 902. The AR software application 902 may comprise the logic modules that generate the AR session and detect and transmit signals related to the AR session. These and other software components may be loaded into memory 906 of computing system 900 using a drive mechanism (not shown) associated with a non-transitory computer-readable medium 916, such as a DVD/CD-ROM drive, memory card, network download, or the like.

Memory 906 may also include an AR content database 128. In some embodiments, computing system 900 may communicate with AR content database 128 via network interface 910, a storage area network ("SAN"), a high-speed serial bus, and/or via the other suitable communication technology. In some embodiments, AR content database 128 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Figure 10:
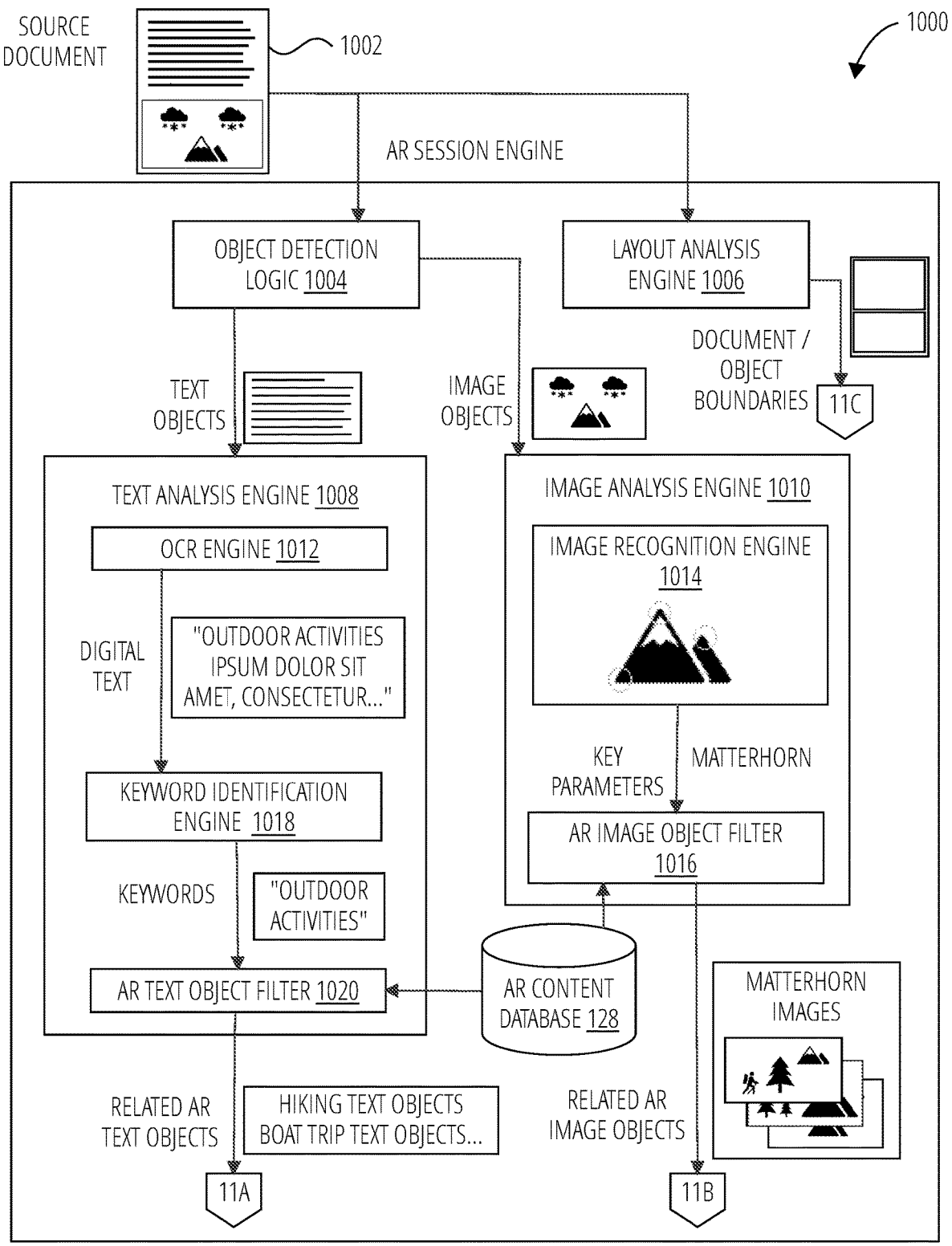
FIG. 10 illustrates an AR session engine 1000 in accordance with one embodiment.

Referring to FIG. 10, the AR session engine 1000 comprises object detection logic 1004, a layout analysis engine 1006, a text analysis engine 1008, an image analysis engine 1010, an OCR engine 1012, an image recognition engine 1014, an AR image object filter 1016, a keyword identification engine 1018, and an AR text object filter 1020.

A source document 1002 may be processed into the AR session engine 1000. The source document 1002 may first be analyzed by the object detection logic 1004 and the layout analysis engine 1006. The object detection logic 1004 may determine what objects are comprised by the source document 1002, and whether those objects are text objects or image objects. The layout analysis engine 1006 may analyze the source document 1002 to determine source document boundaries and source object boundaries.

The text analysis engine 1008 may further perform optical character recognition (OCR) on the text objects detected by object detection logic 1004, using an OCR engine 1012. The OCR engine 1012 may analyze the pixels in the source document 1002 associated with text and recognize them as alphanumeric characters that compose words and sentences. The OCR engine 1012 may return the recognized words and sentences as digital text. This digital text may be further analyzed by a keyword identification engine 1018. The keyword identification engine 1018 may use logic similar to that illustrated in FIG. 8, or some other logical methodology, to detect keywords in the digital text. These keywords may be passed to an AR text object filter 1020, where they may be applied as a filter to AR text objects stored in an AR content database 128. The AR text object filter 1020 may return AR text objects related to the keywords, as well as the original source text objects.

The image analysis engine 1010 may further perform image recognition algorithms within an image recognition engine 1014. These algorithms may use edge detection and object detection logic to identify key parameters that characterize the subject or subjects pictured in the image. The key parameters may be passed to an AR image object filter 1016, where they may be applied as a filter to AR image objects stored in the AR content database 128. The AR image object filter 1016 may return AR image objects related to the key parameters, as well as the original source image objects.

Figure 11:
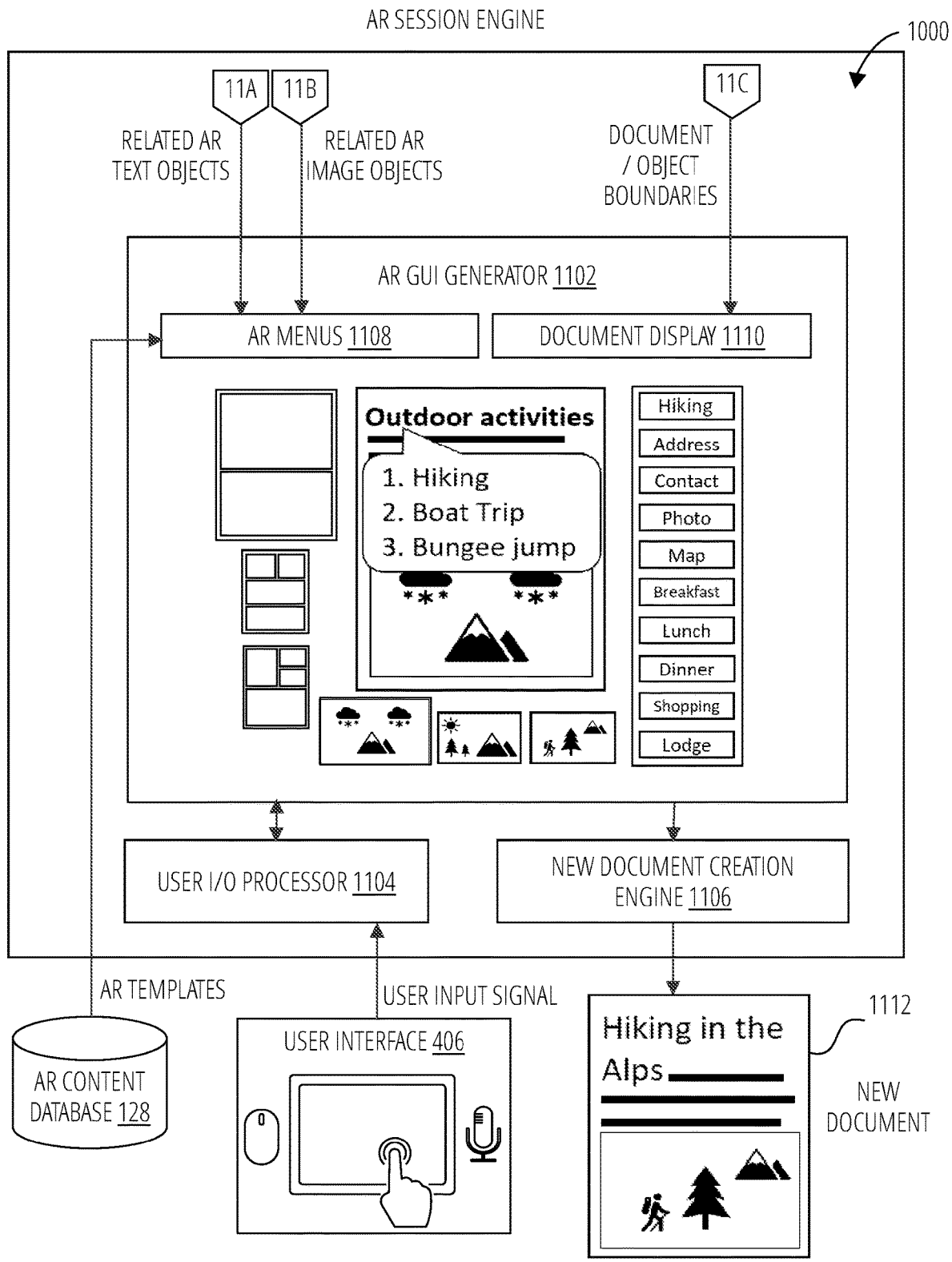
FIG. 11 illustrates an AR session engine 1000 in accordance with one embodiment.

Referring to FIG. 11, the AR session engine 1000 further comprises an AR GUI generator 1102, a user I/O processor 1104, and a new document creation engine 1106. An AR GUI in accordance with one embodiment is illustrated, along with the logical components used to create and manipulate it.

The related AR text objects from the text analysis engine 1008, the related AR image objects from the image analysis engine 1010, and the source document boundaries and source object boundaries from the layout analysis engine 1006 may all be sent to an AR GUI generator 1102. The AR GUI generator 1102 may generate AR menus 1108 and a document display 1110 as part of the AR GUI.

The AR menus 1108 may allow the user to select from the related AR text and image objects from the text and image analysis engines, as well as AR templates from the AR content database 128. The document display 1110 may use the source document boundaries and source object boundaries to construct a starting display of the document, allowing a user to visualize the desired changes, while maintaining the ability to return to a view of the original source document 1002 for reference.

The AR GUI generator 1102 transmits and receives signals from a user I/O processor 1104. Signals from the AR GUI generator 1102 to the user I/O processor 1104 may configure display devices included in the user interface 406 to show the AR GUI to the user. Signals from the user interface 406 indicating user input may be interpreted by the user I/O processor 1104 as commands that may be returned to the AR GUI generator 1102 to indicate menu selections that may effect changes in the displayed document.

Once the user is satisfied with the document, the user may signal the AR GUI generator 1102 to configure the modified document for saving or printing. The AR GUI generator 1102 may transmit the document configuration information to the new document creation engine 1106. The new document creation engine 1106 may use the signal from the AR GUI generator 1102 to generate a new document 1112, which may be saved or printed as desired by the user.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method comprising:
   detecting a source document, wherein the source document includes at least one of source text objects, source image objects, and a combination thereof;
   performing a text analysis on the source text objects;
   performing an image analysis on the source image objects;
   performing a layout analysis wherein the layout analysis establishes source document boundaries and source object boundaries for the source document and returns a source template;
   configuring an augmented reality (AR) session, wherein the AR session includes AR menus, the source text objects, the source image objects, the source templates, an AR graphical user interface (GUI) that accepts user input from a user, and an AR content database that includes AR text objects, AR image objects, and AR templates;
   receiving a signal from the AR session indicating the user input for a new document, wherein the signal from the AR session indicates that the new document contains partially superimposed content, wherein the partially superimposed content will replace at least one of the source text objects and the source image objects with the AR text objects and the AR image objects identified by the user;
identifying the source object boundaries of the source text objects and the source image objects to be replaced;
configuring the AR text objects and the AR image objects to fit into the source object boundaries;
filling the source object boundaries with a white area of equal dimensions; and
generating the new document, wherein the new document comprises the source document modified by the signal from the AR session, and wherein generating the new document includes drawing the AR text objects and the AR image objects over the white area.

2. The method of claim 1, the text analysis comprising:
executing optical character recognition and identifying keywords in the source text objects;
searching the keywords for named entities, wherein the named entities include people, places, and organization names;
searching the keywords for date/time entities, wherein the date/time entities include alphabetic and numeric indicators of date and time;
using the named entities to determine location context for the source document;
using the date/time entities to determine time sensitivity for the source document;
operating one or more text filters to select the AR text objects stored in the AR content database based on the keywords, the location context, and the time sensitivity; and
returning the AR text objects selected.

3. The method of claim 1, the image analysis comprising:
executing image recognition logic to identify key parameters in the source image objects;
operating one or more image filters to select the AR image objects stored in the AR content database based on the key parameters; and
returning the AR image objects selected.

4. The method of claim 1, wherein the source template is generated from the source document boundaries and the source object boundaries established by the layout analysis.

5. The method of claim 1, wherein the AR GUI allows the user to replace at least one of the source text objects, the source image objects, the source template, and a combination thereof, with selections from the AR menus.

6. The method of claim 1, further comprising:
detecting insertion of handwritten notes or drawings on the source document, wherein the handwritten notes or drawings are generated by the user manipulating a touch screen or other input device;
detecting dimensions and screen position of the handwritten notes or drawings; and
saving the handwritten notes or drawings, the dimensions, and the screen position for use in the new document.

7. The method of claim 1, wherein the user input includes at least one of:
a current date, a current time, and a current location, either entered manually or collected from a computing apparatus implementing the method, and wherein the current date, the current time, and the current location, are used to operate one or more filters to select the AR text objects and the AR image objects returned;
touch selection and touch navigation signals detected through a touch screen; and
signals detected through a microphone, detection of signals through the microphone further comprising:
detecting vocal commands through the microphone;
interpreting the vocal commands as voice selection and voice navigation signals;
executing speech recognition logic to tokenize the user input into parts of speech; and
using nouns as keywords to search the AR content database.

8. The method of claim 1, wherein the source document comprises at least one of:
a digital image captured from printed content, wherein the printed content comprises at least one printed page; and
a screen of digitally displayed content saved from a digital source.

9. The method of claim 1, further comprising printing at least one of:
a physical copy of the new document; and
a physical copy of the source document.

10. A method comprising:
detecting a source document, wherein the source document includes at least one of source text objects, source image objects, and a combination thereof;
performing a text analysis on the source text objects;
performing an image analysis on the source image objects;
performing a layout analysis wherein the layout analysis establishes source document boundaries and source object boundaries for the source document and returns a source template;
configuring an augmented reality (AR) session, wherein the AR session includes AR menus, the source text objects, the source image objects, the source templates, an AR graphical user interface (GUI) that accepts user input from a user, and an AR content database that includes AR text objects, AR image objects, and AR templates;
receiving a signal from the AR session indicating the user input for a new document, wherein the signal from the AR session indicates that the new document contains fully superimposed content, wherein the fully superimposed content will replace all of the source text objects and the source image objects with the AR text objects and the AR image objects identified by the user;
querying the user to select the AR template from the AR content database;
querying the user to select the AR text objects and the AR image objects desired to populate the AR template selected;
configuring the AR text objects and the AR image object selected to fit the AR template selected; and
generating the new document, wherein the new document comprises the source document modified by the signal from the AR session, and wherein generating the new document includes drawing the AR text objects and the AR image objects over the AR template.

11. The method of claim 10, the text analysis comprising:
executing optical character recognition and identifying keywords in the source text objects;
searching the keywords for named entities, wherein the named entities include people, places, and organization names;
searching the keywords for date/time entities, wherein the date/time entities include alphabetic and numeric indicators of date and time;
using the named entities to determine location context for the source document;
using the date/time entities to determine time sensitivity for the source document;

operating one or more text filters to select the AR text objects stored in the AR content database based on the keywords, the location context, and the time sensitivity; and returning the AR text objects selected.

12. The method of claim 10, the image analysis comprising:

executing image recognition logic to identify key parameters in the source image objects;

operating one or more image filters to select the AR image objects stored in the AR content database based on the key parameters; and returning the AR image objects selected.

13. The method of claim 10, wherein the source template is generated from the source document boundaries and the source object boundaries established by the layout analysis.

14. A system comprising:

at least one of a camera, a scanner, a network interface, and image storage, whereby a user may acquire a source document;

an augmented reality (AR) content database, wherein the AR content database contains AR text objects, AR image objects, and AR templates;

a user interface, wherein the user interface allows the user to interact with the AR text objects, the AR image objects, the AR templates, and the source document, wherein the source document contains at least one of source text objects, source image objects, and combinations thereof; and a computing apparatus, the computing apparatus comprising:

a processor; and a memory storing instructions that, when executed by the processor, configure the apparatus to:

detect the source document, wherein the source document includes at least one of the source text objects, the source image objects, and a combination thereof;

perform a text analysis on the source text objects;

perform an image analysis on the source image objects;

perform a layout analysis wherein the layout analysis establishes source document boundaries and source object boundaries for the source document and returns a source template;

configure an AR session, wherein the AR session includes AR menus, the source text objects, the source image objects, the source templates, an AR graphical user interface (GUI) that accepts user input from the user, and the AR content database that includes the AR text objects, the AR image objects, and the AR templates;

receive a signal from the AR session indicating the user input, wherein the signal from the AR session indicates that a new document contains superimposed content;

on condition that the signal from the AR session indicates the superimposed content is partially superimposed content, wherein the partially superimposed content will replace at least one of the source text objects and the source image objects with the AR text objects and the AR image objects identified by the user, the instructions further configure the apparatus to:

identify the source object boundaries of at least one of the source text objects and the source image objects to be replaced;

configure the AR text objects and the AR image objects identified by the user to fit into the source object boundaries;

fill the source object boundaries with a white area of equal dimensions; and generate the new document, wherein the new document comprises the source document modified by drawing the AR text objects and the AR image objects over the white area; and on condition that the signal from the AR session indicates the superimposed content is fully superimposed content, wherein the fully superimposed content will replace all of the source text objects and the source image objects with the AR text objects and the AR image objects identified by the user, the instructions further configure the apparatus to:

query the user to select the AR template desired from the AR content database;

query the user to select the AR text objects and the AR image objects desired to populate the AR template selected; and configure the AR text objects and the AR image objects selected to fit the AR template selected; and generate the new document, wherein the new document comprises the source document modified by drawing the AR text objects and the AR image objects over the AR template.

15. The system of claim 14, wherein the user interface includes a microphone, the instructions further configuring the apparatus to:

detect the user input in form of vocal commands through the microphone;

execute speech recognition logic to tokenize the user input into parts of speech; and use nouns as keywords to search for the AR text objects, the AR image objects, and the AR templates indicated by the user input.

16. The system of claim 14, further comprising global positioning satellite (GPS) receiver technology, wherein the instructions further configure the apparatus to:

detect a current date, a current time, and a current location, either entered manually or detected through time keeping and GPS functionality included in the system's logic; and use the current date, the current time, and the current location to operate one or more filters to select the AR text objects and the AR image objects returned.

17. The computing apparatus of the system of claim 14, wherein the instructions further configure the computing apparatus to:

detect insertion of handwritten notes or drawings on the source document, wherein the handwritten notes or drawings are generated by the user manipulating a touch screen or other input device;

detect dimensions and screen position of the handwritten notes or drawings; and save the handwritten notes or drawings, the dimensions, and the screen position for use in the new document.

18. The computing apparatus of the system of claim 14, wherein the instructions further configure the computing apparatus to:

search keywords for named entities, wherein the named entities include people, places, and organization names;

search the keywords for date/time entities, wherein the date/time entities include alphabetic and numeric indicators of date and time;

use the named entities to determine location context for the source document; and use the date/time entities to determine time sensitivity for the source document.

19. The system of claim 14, wherein the AR content database is cloud-based and is accessed through the network interface.

20. The system of claim 14, further comprising at least one of a printer and multifunctional peripheral device, wherein the printer and the multifunctional peripheral device are capable of generating a physical copy of a digital image, the instructions further configuring the apparatus to:

allow the user to print the source document without alteration; and allow the user to print the new document generated through the AR session.

* * * * *